INVENTOR
KARL REPPERT
BY
ATTORNEY

United States Patent Office 2,923,522
Patented Feb. 2, 1960

2,923,522

FLUIDALLY ACTUATED FLAP SEAL

Karl Reppert, Heidenheim, Germany, assignor to Fa. Johannes Erhard H. Waldenmaier Erben, Heidenheim (Brenz), Germany, a corporation of Germany Application September 16, 1958, Serial No. 761,433

Claims priority, application Germany September 19, 1957

2 Claims. (Cl. 251—158)

The present invention relates to a fluidally actuated flap seal to be used particularly for butterfly valves in connection with hot media flowing in the conduit system.

Metallic sealing rings are known which are displaceably arranged at the periphery of a flap disc and are pressed into their closed, operative position by the pressure of the flowing medium. Moreover, throttle and butterfly valves are also known, the flap of which can be raised axially from its seat and then turned into open position.

In all these known structures, it is unavoidable that the temperatures of the media are not allowed to exceed certain normal limits, because at a higher temperature range the sealing ring assumes a deformed or distorted shape and does not provide a sufficient sealing in the valve housing.

It is, therefore, one object of the present invention to provide a valve disc ring which is rotatably mounted on an axle disposed in a bearing of a housing and which is equipped with a flap seailng ring adapted to engage sealingly a valve seat or to be fluidally lifted and floatingly held in an open position to avoid fluttering of the valve when a hot medium rapidly flows therethrough.

It is another object of the present invention to provide a valve disc ring which includes a flap sealing ring, the latter forming a hub-like radial projection, while the valve disc ring has two annular guide plates disposed adjacent to and spaced apart from said hub-like projection, so that a chamber is defined on both sides of said hub-like projection. The chambers may be fed selectively, with a pressure medium so that upon feeding of the pressure medium into one of the chambers a perfect sealing of the flap sealing ring is brought about, in spite of deformation of the valve disc due to exposure to a very hot medium flowing at great speed in the conduit system, as for instance, in reactor gas cooling circuits. Upon feeding the pressure medium into the other of the chambers, the flap sealing ring is removed from the valve seat. In order to feed the pressure medium to the respective chambers, regardless of the position of the valve disc ring, the conduits leading to said chambers are disposed axially in the axle upon which the valve disc ring rotates.

With these and other objects in view, which will become apparent in the following detailed description, the present invention will be clearly understood in connection with the accompanying drawing, in which.

Figure 1:
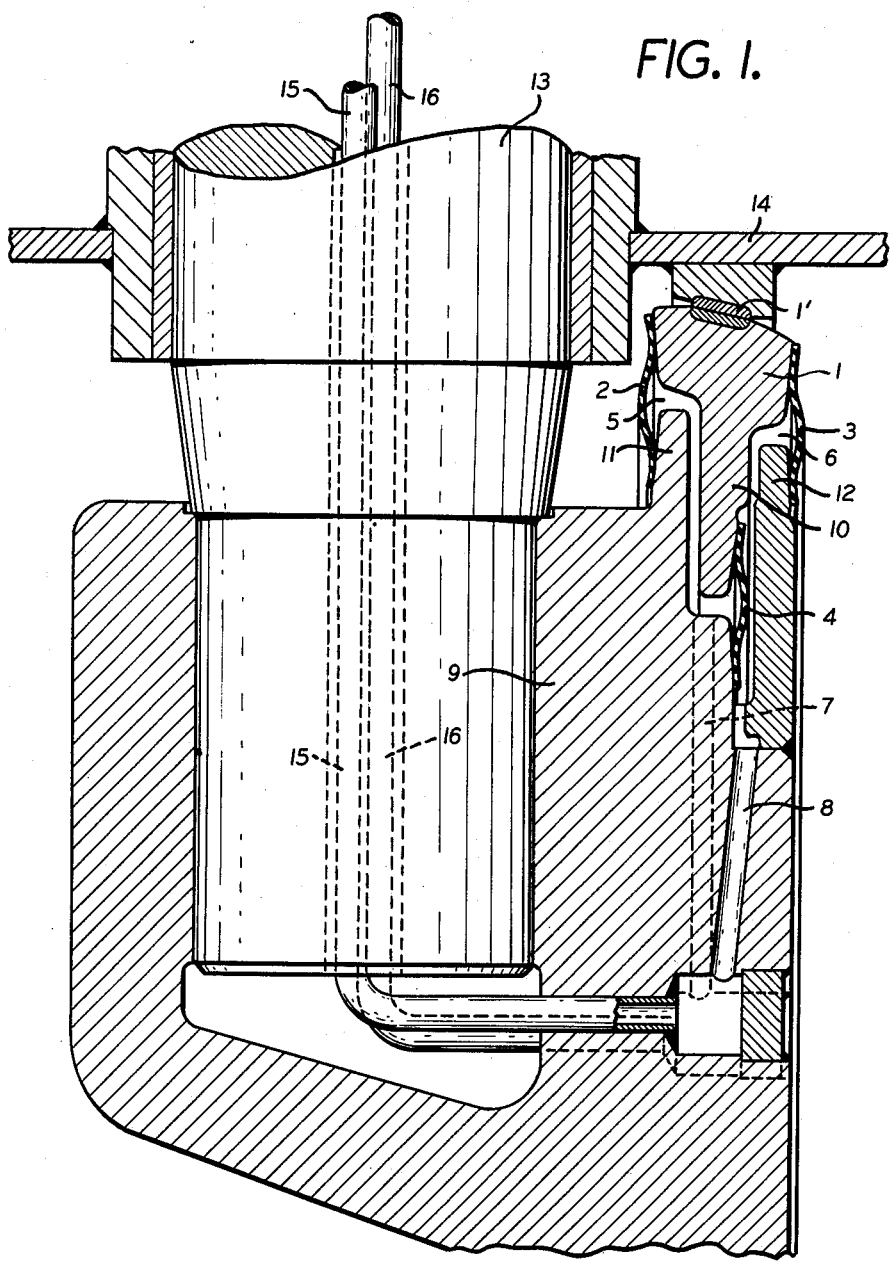
Figure 1 is an axial section of a portion of the valve disc ring.
Figure 2:
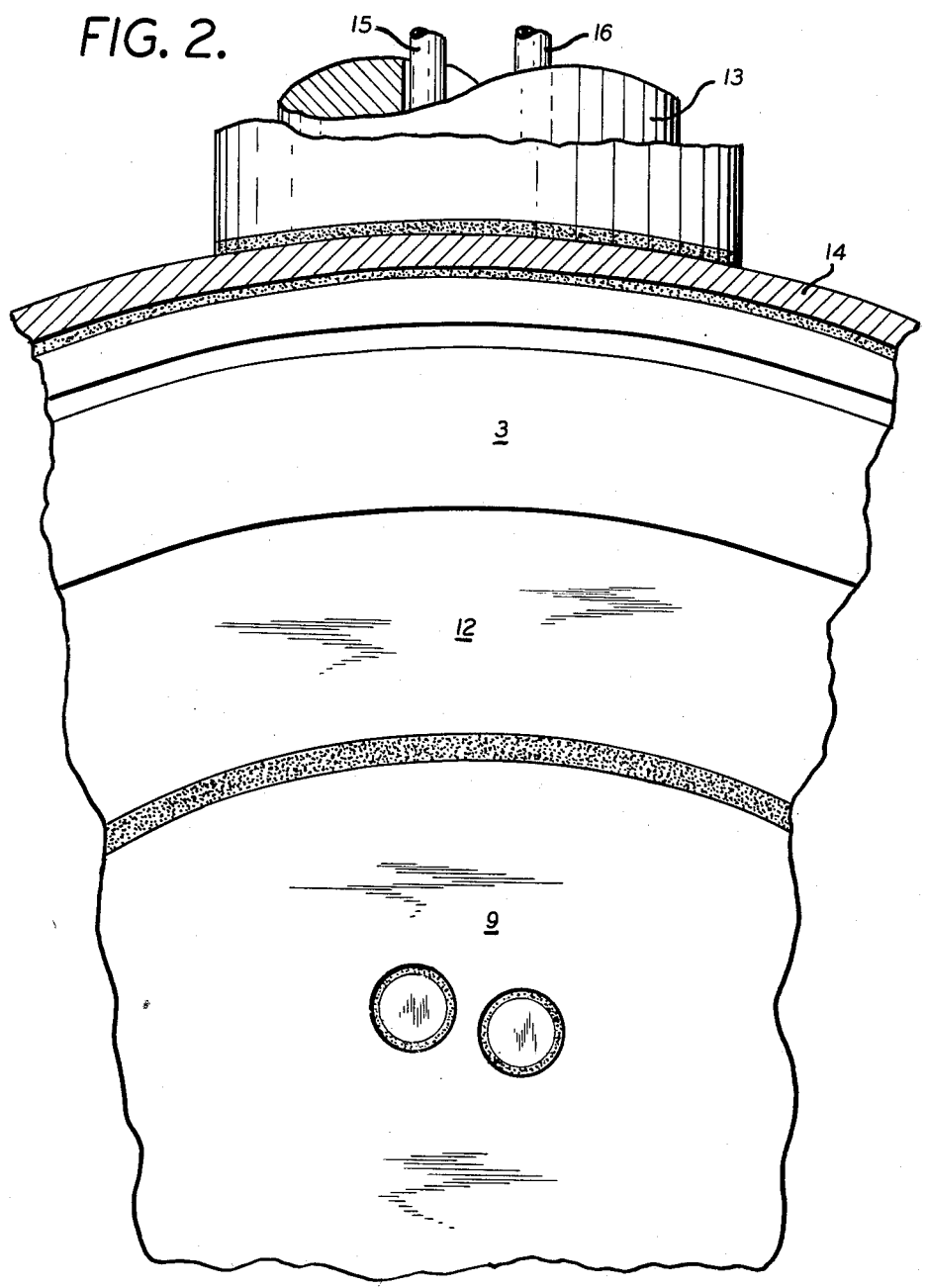
Fig. 2 is an end view thereof.

Referring now to the drawing, the present valve disc ring 9 is rotatably mounted in conventional manner upon an axle 13 mounted in a housing 14, the latter being equipped with a valve seat 1'. The valve disc ring 9 forms two parallel disposed annular guide plates 11 and 12 which are spaced apart to provide a recess between said guide plates 11 and 12.

A loose or floating flap sealing ring 1 having an annular radially projecting hub portion 10 is arranged on the periphery of the valve disc ring 9 in such a manner that the hub portion 10 is freely disposed in the recess formed between the guide plates 11 and 12. Due to the fact that the hub portion 10 is spaced apart from the guide plates 11 and 12, two chambers 5 and 6 are defined between the flap sealing ring 1 and its hub portion 10 jointly with one of the guide plates, on the one hand, and between the flap sealing ring 1 and its hub portion 10 and the other of the guide plates, on the other hand. Diaphragms 2, 3 and 4 are secured to the front and rear faces of the floating flap sealing ring 1 and the corresponding faces of the guide plates 11 and 12. Diaphragms 2, 3 and 4 not only seal chambers 5 and 6 from the conduit system, but also permit the floating of the flap sealing ring 1 by the agency of a fluid medium between the annular guide plates 11 and 12 of the valve disc ring 9.

The chambers 5 and 6 can be selectively connected to a supply of compressed air or any other pressure medium, by means of conduits 15 and 16, respectively, the main portion of which extends axially through the axle 13, so that the pressure medium can be fed into the respective chambers 5 and 6 regardless of whether the valve disc ring 1 is in its operative closing position or in its open position.

Due to the fact that the flap sealing ring 1 floats freely upon the periphery of the valve disc ring 9, by application of hydraulic or pneumatic pressure, the flap sealing ring 1 may be adjusted to any deformation caused by the effects of high or varying temperatures of the medium flowing through the system, whereby a perfect sealing between the valve seat 1' and the flap sealing ring 1 is assured, without causing a fluttering of the valve disc ring 9 in its open position even at a very high speed of the flowing medium.

While I have disclosed one embodiment of the present invention, it is to be understood that this embodiment is given by example only and not in a limiting sense, the scope of the present invention being determined by the objects and the claims.

I claim:

1. In a butterfly valve, a housing carrying a valve seat, a valve disc ring, an axle secured to said housing, said valve disc rotatably mounted on said axle and including a flap sealing ring engaging said valve seat, said flap sealing ring having a radially projecting hub portion, said valve disc having annular guide plates disposed adjacent to and slightly spaced apart from the front face and the rear face, respectively, of said hub portion, said front face of said hub portion, with one of said guide plates defining a first chamber and the rear face of said hub portion with the other of said guide plates defining a second chamber, said flap sealing ring mounted floatingly between said guide plates of said valve disc ring, and first diaphragms connected to said flap sealing ring and said guide plates and closing each of said chambers, and a second diaphragm connected to said hub portion and said valve disc ring and separating said first and second chambers, and a conduit leading into each of said chambers, in order to feed a pressure medium selectively into said chambers.

2. The butterfly valve, as set forth in claim 1, wherein said conduits are disposed along the longitudinal axis of said axle in order to feed said pressure medium into said respective chambers regardless of the position of said valve disc ring.

References Cited in the file of this patent

UNITED STATES PATENTS

| 715,745 | Bickford | Dec. 16, 1902 |
| 2,791,396 | Reppert | May 7, 1957 |
| 2,825,528 | Truit | Mar. 4, 1958 |

FOREIGN PATENTS

| 720,579 | France | Dec. 4, 1931 |